July 24, 1962    J. E. LOVELOCK    3,046,396
METHOD AND APPARATUS FOR DETECTION OF GASES AND VAPORS
Filed May 6, 1958    2 Sheets-Sheet 1
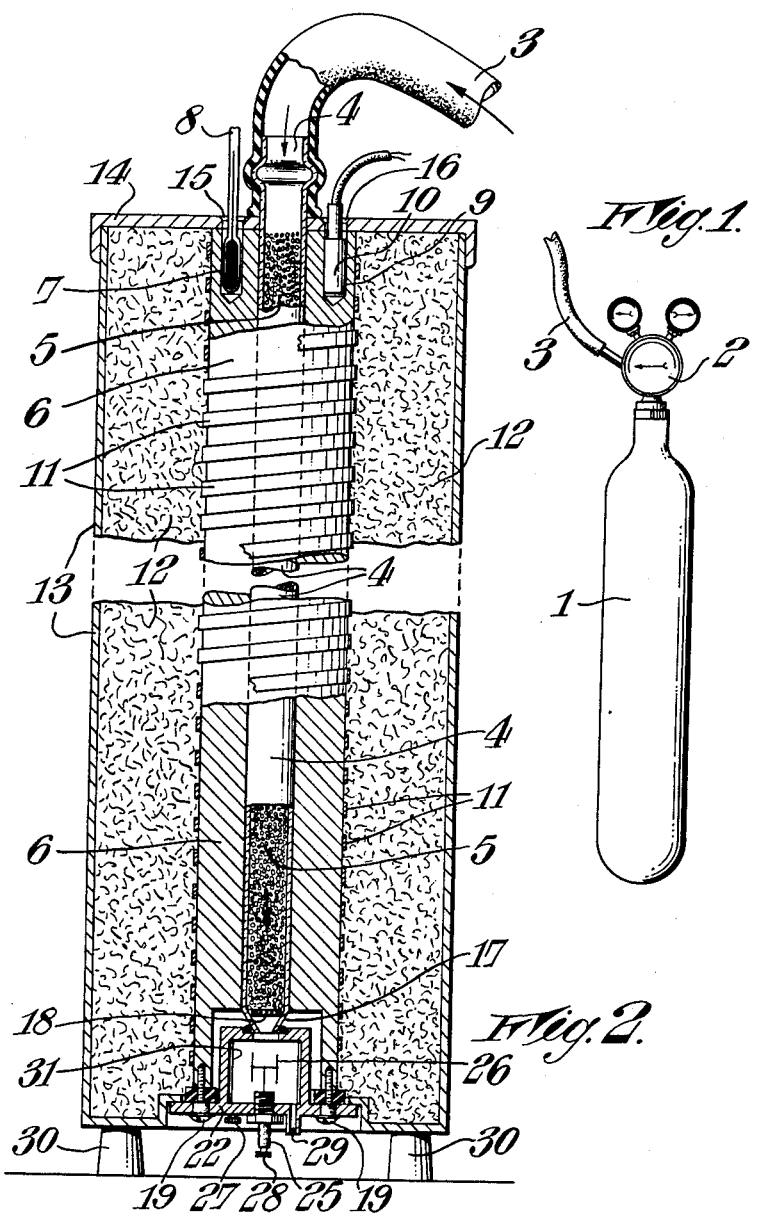
INVENTOR
JAMES E. LOVELOCK
BY Larson and Taylor
ATTORNEYS July 24, 1962    J. E. LOVELOCK    3,046,396
METHOD AND APPARATUS FOR DETECTION OF GASES AND VAPORS
Filed May 6, 1958    2 Sheets-Sheet 2

INVENTOR
JAMES E. LOVELOCK

ATTORNEYS

3,046,396
METHOD AND APPARATUS FOR DETECTION OF GASES AND VAPORS

James E. Lovelock, London, England, assignor to National Research Development Corporation, London, England, a British corporation
Filed May 6, 1958, Ser. No. 733,429
Claims priority, application Great Britain May 7, 1957
5 Claims. (Cl. 250—43.5)

This invention concerns improvements in or relating to the detection and/or measurement of low concentrations of gases and vapours.

The development and growing importance of gas chromatography as a method for the analysis and separation of complex mixtures of volatile substances has increased the need for simple and sensitive physical methods of measuring the concentration of gases and vapours, especially organic vapours, in the gas stream issuing from the chromatograph column. None of the methods at present in use however fulfil the ideal requirements for such a method, being either too insensitive or having responses which are non-linear and unrelated to any simple molecular parameter, so that calibration for each substance to be detected may be necessary.

This invention provides a method of detection based on the unique ionisation properties of the rare gases and on the differences in the ionisation cross-section of different molecular species. References to the ionisation cross-section are made in relation to the collision reaction between excited rare gas atoms and the molecular species to be detected, which differs fundamentally from the ionisation cross-section for ionisation by alpha-, beta- or gamma-radiation. The present method has a sensitivity which can be varied over a wide range, and which will permit the detection of as little as $2.10^{-13}$ moles of most organic substances. In spite of its high sensitivity to vapour composition, the detector device employed, which is simple to construct, may be made relatively insensitive to temperature, pressure and gas flow rate. In addition to these desirable properties, the detector displays no "memory" effects and has a response which is very similar for different molecular species, and which can be made a close approximation to a truly linear one.

The absorption of ionising radiation by gases produces both ions and also excited but non-ionised, i.e. metastable, atoms and molecules. With most gases the life of the metastable atoms is short (ca. $10^{-9}$ second) as compared with that of the ions. The rare gases are however unusual in their possession of long-lived metastable atoms, and in these gases the concentration of metastable atoms approaches that of ions during steady irradiation. In the pure gas the metastable atoms decay eventually to the normal state, with the emission of ultraviolet radiation; in the presence of small traces of other gases or vapours, however, the energy of excitation of the metastable rare gas atoms can, during their lifetime, be transferred to the trace molecules on collision therewith. If the ionisation potential of the trace molecules is equal to or less than the excitation potential of the metastable rare gas atoms, the transfer of energy on collision leads to the ionisation of the trace gas or vapour molecules. The molecules of most organic compounds have ionisation potentials lower than the excitation potentials of the metastable atoms of at least one of the rare gases, particularly those of helium, neon, and argon, and are therefore ionised on collision with metastable atoms of these rare gases.

According to the invention there is provided a method of detecting and/or measuring low concentrations of gaseous or vaporised substances, in which said substance(s) are introduced in low concentration into an atmosphere of a rare gas having an excitation potential equal to or higher than the ionisation potential of the substance(s) and substantially free from impurities of lower excitation potential, the rare gas atoms being excited partially to a metastable state, and in which the concentration of ions in the presence of said substance(s) is determined relative to the concentration in the absence thereof.

The term "low concentration" as employed herein excludes concentrations so high that erratic and non-linear responses are obtained. The upper limit of concentration may vary somewhat, according to the system investigated, but for all systems so far examined a satisfactory working rule has proved to be that the upper limit of concentration is 1 part by volume of gaseous or vapourized substance per 1,000 parts by volume of rare gas.

The term "substantially free from impurities" is intended to exclude concentrations of impurities so great that the sensitivity of the detector is seriously impaired, and here again a satisfactory working rule has proved to be that the upper limit of concentration for impurities is in the region of 1 part by volume per 1,000 parts by volume of rare gas.

The steady level of ionisation in an irradiated gas is measurable, in an ionisation chamber for example, and hence any increase in the concentration following the addition of another gas or vapour can be detected and measured. The method of detection of this invention makes use of these phenomena.

In practice only two rare gases are at present available in cylinder form and at prices which permit their economic use, namely helium and argon. Helium possesses the highest excitation potential of all the rare gases, and when highly purified is ideal from a technical standpoint. Commercially-available helium however contains sufficient impurity, probably neon and argon, to discharge the metastable helium atoms shortly after their formation, and is not satisfactory. Commercial argon is perhaps not purer than helium, but the excitation potential of metastable argon is lower than that of helium and neon; collision with these gases, which are the main impurities in argon, therefore does not cause the discharge of the metastable argon atoms, and commercial argon functions well without further purification, being for this reason and because of its comparatively low cost the preferred rare gas for use in this invention.

The excitation of the rare gas atoms to a metastable state may be brought about by irradiation of the gas with ionising radiation, say alpha- or beta-particles or gamma-photons. Under certain circumstances this excitation can be sufficiently provided by stray irradiation, as by cosmic rays. It is however preferred to subject the gas to irradiation from an adjacent source of localised radiation.

The intensity of the ionising radiation must be held within approximate limits, since too small or distant a source of radiation may not yield a sufficient ionising current, while too great a source will produce so many ions that the distribution of the electric field within the chamber will be disturbed. Clearly, to minimize radiation hazards, a small closely-adjacent source is desirable. For general guidance it can be said that with a closely adjacent source, a strength of 16–400, preferably 80, microcuries is suitable in the case of a source of alpha particles, and from 2–50, preferably 10, millicuries in the case of a source of beta particles. Suitable sources of ionising radiation for this purpose are for example those of the type used for industrial thickness gauges, in which the radioactive material is firmly bonded into a strip of silver foil so that there is no danger of the escape of radioactive material. Foils of this kind are commercially available for example from the Radiochemical Centre, Amersham, Buckinghamshire, England or U.S. Radium Corp.

Unless the intensity of irradiation is made exceptionally high, however, the processes described above do not result in as high a proportion of metastable argon or other rare gas atoms as may often be desirable, depending on the method of measurement of the concentration of ions adopted as will be described subsequently.

In the presence of free electrons a steady high concentration of metastable rare gas atoms can however be established by the application of a high intensity electric or varying magnetic field, which accelerates the electrons between collisions with rare gas atoms sufficiently to ensure that in at least a proportion of cases the collisions give rise to metastable atoms.

The excitation of the rare gas atoms is therefore preferably accomplished by the simultaneous application of a high intensity field and a source of free electrons. The source of free electrons can of course be ionizing radiation in the manner already described, or can be a cathodic emitter; the high intensity field can then be applied via electrodes in an ionization chamber, or between spark discharge points. In the latter case extremely low concentrations of free electrons are all that is necessary, and these can be provided even by stray cosmic irradiation or very weak sources of ionizing radiation.

The increasing stringency of regulations concerning the use of radioactive materials makes the use of spark discharge methods of exciting the rare gas atoms—and as will be described measuring the concentration of ions—a highly preferred alternative in the procedure of this invention.

A high intensity field and a source of free electrons can however be supplied simultaneously by other methods, including the use of radio frequency discharges and silent discharges at low pressures, and corona discharges at atmospheric pressure. Discharge methods which involve the use of conductive electrodes however suffer from the disadvantage that the emission of electrons is disturbed by the presence of vapour, and it is in practice difficult to obtain consistent and reproducible operation. For this reason, if discharge methods are used it is preferred to employ radio frequency discharges which do not require electrodes within the discharge chamber.

The determination of the concentration of ions can be effected in any convenient way. The steady ionisation current developed between electrodes maintained at a standard potential difference may for example be measured, or it may be more convenient to determine the potential required for a given steady ionization current or an electric spark discharge, or some function related to the potential required for a spark discharge, such as the frequency of discharge in a relaxation oscillator circuit.

Where a steady concentration of metastable atoms has been established in a rare gas by the simultaneous application of a high intensity electric field or varying magnetic field and a source of free electrons, the concentration of excited atoms is related exponentially to the field intensity, and directly to the concentration of free electrons. The concentration of rare gas ions and hence the ionization current remains low until the field intensity approaches a certain value, which so far as can at present be estimated is approximately 2000 volts/cm. at 760 mm. gas pressure. Above this value, which because of difficulties in evaluation is best determined empirically in terms of applied potential for any given detector rather than in absolute terms, the ionization current in even pure rare gas rises to a degree which impairs the sensitivity of the detector. For the greatest sensitivity this field intensity should therefore not be exceeded.

The introduction of low concentrations of molecules of gaseous or vaporized substance(s) into rare gas excited partially to a metastable state leads to ionization of the vapour molecules by transfer of energy of excitation on collision with the metastable atoms, and hence leads to an increase in the concentration of ions.

The most generally acceptable method of measuring the concentration of ions, and hence the vapour concentration, is by means of an ionization chamber. The relationship between ionisation current (I), applied potential (v), and vapour concentration (c) for an ionisation chamber containing a mixture of rare gas and vapour is as follows:

$$I = \frac{Kic(x+y) + Kdx}{Kic(1 - ae^{b(v-1)})} + Kd$$

where $x$ is the concentration of free electrons and $y$ the concentration of excited atoms, both at zero vapour concentration, and $Ki$, $Kd$, $a$ and $b$ are constants. Thus, for a given ionisation current the logarithm of the vapour concentration is linearly related to the applied potential. This relationship is true not only for finite ionisation currents but also for an infinite current, which condition is closely approximated when a spark discharge occurs across the gas.

Other methods of determining the concentration of ions are also available, which are particularly useful in conjunction with the use of a radio-frequency discharge to excite the gas. Detection can for example be accomplished by observing and measuring the change in light emission photoelectrically when vapour is introduced. This method operates best at reduced pressures.

The methods which have been described of measuring vapour concentration in rare gases at atmospheric pressure possess the advantages of exceptional sensitivity and freedom from disturbance by change in ambient temperature and gas flow rate, and are particularly suitable for use with gas chromatography apparatus. The response given by the methods of detection here described is otherwise dependent on a variety of factors; assuming that external factors such as temperature and gas pressure do not fluctuate, the response of any given detector at any applied voltage depends only on the absolute concentration of substance(s) introduced into the rare gas atmosphere, and upon the ionisation cross-section and weight of the molecules of the substance(s). These last two factors are closely related, and it can therefore be said that for all practical purposes, except when comparing substances of very different molecular configuration such as aliphatic and aromatic organic compounds, the response will be dependent only on the absolute concentration of the substance and on its molecular weight.

It is a specific feature of this invention to provide methods of detection as described above in conjunction with gas chromatography techniques. The combination of these methods will in most cases permit positive identification of the volatile substance(s) and/or their quantitative estimation.

Apparatus for use in performing the method of this invention comprises a detector chamber adapted for connection to a source of rare gas, means for rendering said rare gas atoms partially metastable within the chamber, and means for determining the concentration of ions in the rare gas atmosphere in the presence of low concentrations of gaseous or vaporized substance(s).

The means for rendering the rare gas atoms at least partially metastable and for determining the concentration of ions within the detector chamber may be of many different kinds, as already indicated.

In order that the invention may be well understood it will now be described in greater detail though by way of illustration only with reference to the accompanying drawings, in which:

FIGURE 1 is a diagram of a rare gas supply hereinafter referred to;

FIGURE 2 shows a fragmentary longitudinal sectional view through a gas chromatography column incorporating a detector in accordance with this invention, operating by measurement of a continuous ionization current;

Figure 3:
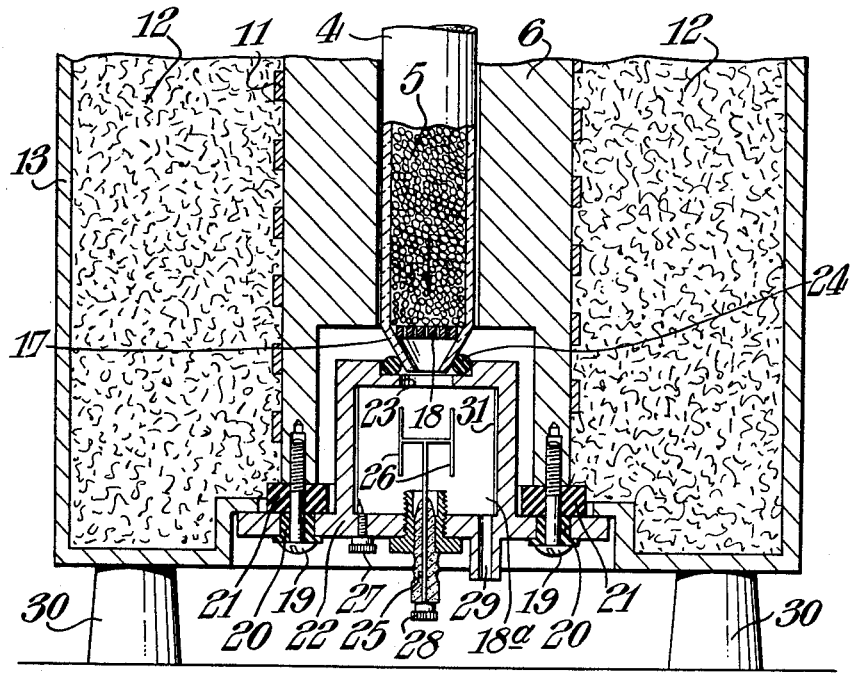
FIGURE 3 shows part of FIGURE 1 on an enlarged scale, depicting the detector in greater detail.

Referring first to FIGURES 1, 2 and 3 a source of highly purified rare gas, preferably argon, is provided by a gas cylinder schematically indicated at 1, with the usual valve and pressure gauge assembly schematically indicated at 2. A flexible rubber or like pipe 3 delivers the gas supply to the top of a glass tube 4, whose interior is packed with a particulate absorbent material generally indicated at 5. This material may be of any suitable kind, and will be chosen having in mind the materials to be subjected to chromatographic analysis. A diatomaceous earth impregnated with about 10% of a substantially involatile high boiling point hydrocarbon oil fraction is for instance frequently very satisfactory.

The glass tube 4 is closely surrounded by a hollow metal rod 6, whose purpose is to even out temperature fluctuations adjacent the tube. The preferred metal is aluminium, since this has a high heat capacity. The glass tube 4 can be introduced into the rod 6 by milling a groove into the latter, placing the glass tube within the groove, and filling the cavity with a suitably shaped aluminium fillet. The upper end of rod 6 is recessed at 7 to receive a thermometer 8, and also recessed at 9 to receive a thermostat or like device 10.

Around the outside of rod 6 over the greater part of its length is wound a heating tape 11, connectable to the power mains, and controlled by the setting of thermostat 10. The rod 6 and heating tape 11 are surrounded by any suitable heat insulating material, such as fiberglass wool 12. This in turn is contained within an external cylindrical jacket 13, whose upper end is closed by cover plate 14, apertured at 15 and 16 to permit thermometer 8 and the connections to thermostat 10 to emerge, and also to allow glass tube 4 to project.

The lower end of glass tube 4 is drawn to a nozzle 17, and a plug 18 may be provided if necessary to prevent material 5 from falling out of the column.

As can best be seen from FIGURE 3, gas issuing from nozzle 17 passes into a cylindrical ionization chamber 18a mounted in a recess in the bottom of rod 6, and secured thereto but electrically insulated therefrom by screws 19 passing through insulating washers 20 and an annular block 21 of electrical insulating material such as polytetrafluorethylene or ceramic interposed between the base plate 22 of the chamber 18a and rod 6. The upper end of chamber 18 is provided with a central aperture 23 disposed opposite nozzle 17. A sealing ring 24 is interposed between nozzle 17 and the upper end of chamber 18a. Through base plate 22 is screwed an insulated electrode generally shown at 25, which may conveniently be a modified form of the conventional automobile spark plug. This electrode 25 terminates within chamber 18 with electrode surfaces such as those generally indicated at 26, which may be of any convenient shape and produce a field strength of high intensity. Suitable terminals for electrical connections are provided, as those indicated at 27 and 28, via which a high potential difference may be imparted to chamber 18a and electrode surfaces 26.

Outlet pipe 29 is provided through base plate 22 to permit gas to be discharged from the apparatus, either to air or to any desired collecting or other device. A base support of any convenient kind, such as that indicated at 30, is provided to support and enclose the bottom end of the apparatus.

Within chamber 18a there is provided a source of ionising radiation, such as foil 31 arranged around the walls thereof. This foil may for example be a radium or radium-D source of alpha-particles, or a strontium source of beta-particles.

While of course for different purposes the arrangements described above may be varied very widely, the following details are given of one embodiment which in practice has proved widely applicable and very successful. The tube 4 can for example be approximately 4 feet in length, and 0.4 centimetre in diameter. It may be enclosed within an aluminum rod 6 about 2.5 to 3 inches in diameter, wrapped in a heating tape capable of developing up to 300 watts. The source of ionising radiation can be an 80 microcurie radium source or a 10 millicurie strontium source. With such apparatus a flow rate of from 10 to 100 millilitres of argon per minute has proved satisfactory for the separation of fatty acids of biological origin differing by only 1 carbon atom, a separation which has hitherto been difficult or impossible to achieve by any other method. The chamber 18a can be formed by drilling a preferably cylindrical block of brass or other suitable metal, the internal dimensions being for example a diameter of about 2.5 centimetres and a similar depth.

With an ionisation chamber of the dimensions specified above, a potential difference of between 600 and 800 volts has been found to give the best results, though if a series resistance is incorporated in the circuitry, as will be described hereinafter, this potential difference can with advantage be increased into the range of 600–2,000 volts, according to the chamber design. By varying the voltage the sensitivity can be varied by as much as a factor of $10^4$.

For satisfactory operation with an ionisation chamber of the type just described sufficient radiation to give an ionisation current of $10^{-8}$ to $10^{-9}$ amperes is required. With currents smaller than this, expensive amplifiers may be needed and with higher currents the operation of the detector may be impaired by space charge effects. A ten millicurie $^{90}$Sr source of beta radiation and a 80 microcurie radium source of alpha radiation have both been found satisfactory. The $^{90}$Sr source is preferred since the noise level of the device is inversely related to the mean number of ionising particles entering the chamber in unit time, and this is nearly 100 times as great from the $^{90}$Sr source as from the radium source.

The external radiation from the assembled detector is less than 10 mR per hour at the surface, so that the assembled apparatus does not present an external radiation hazard. The exposed sources however are distinctly hazardous and all precautions appropriate to the handling of radioactive material should be taken during the assembly and dismantling of the detector.

The ionisation current developed within the chamber is of the order of $10^{-8}$ amperes and may be recorded by known means. It may for example conveniently be conveyed to a milliammeter or to a simple pen recorder by a D.C. current amplifier of the type developed for use with ionisation devices. The input resistance of the amplifier may be $2.10^9$ ohms and the steady voltage developed across it by the ionisation current with pure argon flowing in the detector is then approximately 20 volts. An equal and opposite voltage may be applied to the input of the amplifier from a potentiometer chain, so that the indicating meter reads zero for pure argon, and gives a positive deflection with argon containing organic compounds.

In the apparatus described above the response of the detector is less than linear up to the point at which the rate of decay of metastable atoms, either spontaneously or by collision, exceeds their rate of formation by collision with electrons accelerated by the applied field. This point is generally characteristic of any given device, and varies only slightly with temperature and small changes in atmospheric pressure. Thereafter, the response becomes more than linear, i.e. exponential, as a form of chain-reaction sets in, and electron multiplication occurs because the electrons liberated on ionization of the vapour molecules are able to produce more excited atoms than are lost by decay. This exponential departure from linearity can however be corrected by incorporating a high-value resistance in series with the ionization chamber electrodes, since then any increase in ionization current causes the potential applied to the electrodes to drop, and a suitable value resistor can be chosen to give substantially linear operation above the minimum value. The value of the resistance depends on the design of the chamber and the current which will flow in the chamber with pure argon. In the device described above a value in the region of 2000 ohms was found approximately correct.

Figure 4:
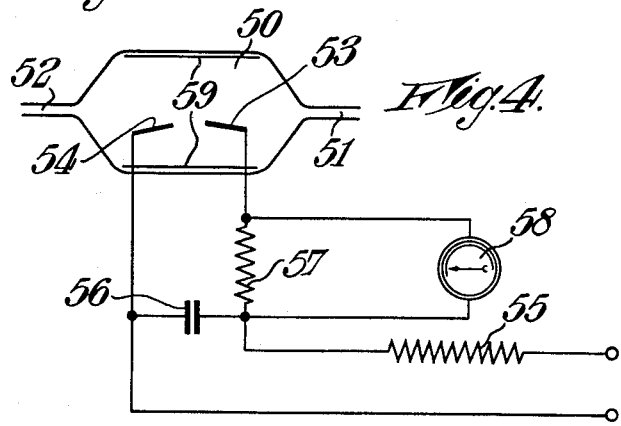
FIGURE 4 is a diagrammatic illustration of an alternative embodiment of detector device, operating by discontinuous spark discharge in the gas stream.

FIGURE 4 illustrates an alternative and in many respects more convenient embodiment of detector according to the invention, and some of the associated circuitry.

As can be seen, the device comprises a detection chamber 50 with inlet and outlet openings 51 and 52 for the gas stream. Sealed into the glass chamber walls are platinum wires 53 and 54 which define a spark gap within the chamber having a width of say 5–10 mm. In pure argon with a gap of these dimensions sparks will occur at atmospheric pressure when the applied potential is in the region of 2000 volts. In the presence of vapour the breakdown potential falls toward 800 volts, and is related logarithmically to the vapour concentration in accordance with the previously given relationship. The simplest form of apparatus therefore is as described above with wires 53 and 54 connected via a resistance 55 to a source with an E.M.F. of 1–3 kilovolts, an electrostatic voltmeter (not shown) being connected across wires 53 and 54 to register the breakdown voltage. 59 indicates a source of ionising radiation.

In order to obtain a linear response to vapour concentration with the same apparatus, however, the spark gap is preferably connected as shown to a condenser 56 and a resistance 57, so as to function as a relaxation oscillator. The frequency of sparks across the gap is then a logarithmic function of the breakdown potential, and is thus directly related to the vapour concentration. The signal from the spark is of course large, and the most elementary type of frequency meter 58 serves to indicate the vapour concentration.

For the stable operation of the device it is necessary to include with it a weak source of ionisation; this can be either a small quantity (ca. 1 microcurie) of an alpha-, beta- or gamma-particle emitting element, indicated at 59, or a corona discharge from a subsidiary electrode. The spark device is very sensitive and responds to as little as $10^{-13}$ moles of most organic vapours. The spark discharge is capable of conducting large currents, sufficient for example to operate an electro-magnetic relay connected in series with it. It is a simple matter to arrange that the relay operates at any predetermined vapour concentration by choosing the appropriate applied potential for the spark gap. This type of operation would have great potentialities in the development of control and warning devices.

I claim:

1. A method of detecting low concentrations of gaseous and vaporized substances comprising the steps of introducing said substances into a rare gas atmosphere, partially exciting said rare gas to a metastable state by means for producing a source of free electrons, applying a high intensity field not less than approximately two thousand volts per centimeter at normal temperature and pressure to accelerate said electrons and thereby multiply the excitation of said rare gas, and determining the concentration of said substances by measuring the change in a characteristic of an electrical circuit connected to a pair of electrodes in said rare gas atmosphere.

2. Apparatus for detecting low concentrations of gaseous and vaporized substances contained in an atmosphere of a rare gas comprising a chamber having an inlet opening at one end and an outlet opening at the other end for said rare gas, means for producing a source of free electrons within said chamber to partially excite said rare gas to a metastable state, means to apply a high intensity field not less than approximately two thousand volts per centimeter at normal temperature and pressure to said chamber to accelerate said electrons and thereby multiply the excitation of said rare gas, electrode means in said chamber, an external electrical circuit including a source of potential connected to said electrode means, and means to detect a change in an electrical characteristic of said circuit due to the presence of said substances.

3. Apparatus as claimed in claim 2 wherein said chamber is made of metal and constitutes an electrode, said means for producing the source of free electrons is constituted by a source of radiation in contact with a wall of said chamber, and comprising an insulator passing through a wall of said chamber, and a second electrode supported by said insulator disposed substantially in the centre of said chamber, said high intensity field being produced by applying a high potential between the two electrodes.

4. Apparatus as claimed in claim 2 wherein said chamber is made of insulating material, said electrode means is constituted by two electrodes mounted in a wall of said chamber, and said means for producing the source of free electrons comprises a radiation source attached to a wall of said chamber.

5. Apparatus as claimed in claim 4 comprising a capacitor and a resistance connected in series with said electrodes, said source of potential being connected across said capacitor and being sufficiently high to cause a succession of sparks to pass between said electrodes, the frequency of said sparks depending upon the concentration of said substances, and a frequency meter connected across said resistance.

References Cited in the file of this patent

UNITED STATES PATENTS

| 2,641,710 | Pompeo et al. | June 9, 1953 |
| 2,761,976 | Opermaier et al. | Sept. 4, 1956 |
| 2,755,388 | Weisz | July 17, 1956 |

OTHER REFERENCES

Jesse et al.: Ionization by Alpha Particles in Mixtures of Gases, article in Physical Review, vol. 100, No. 6, December 15, 1955, pages 1755 to 1762.

Boer: A Comparison of Detection Methods for Gas Chromatography Including Detection by Beta Ray Ionization, article in Vapour Phase Chromatography, Butterworth Scientific Publishing Co., London, England, presented June 1, 1956, pages 169–184.

Deal et al.: A Radiological Detector for Gas Chromatography, article in Analytical Chemistry, vol. 28, No. 12, December 1956, pages 1958 to 1964.